United States Patent Office 3,507,665
Patented Apr. 21, 1970

3,507,665
COATING EMULSIONS AND METHOD OF
COATING FOODSTUFFS
Larry J. Henthorn, Crystal Lake, Ill., assignor to The Quaker Oats Company, Chicago, Ill., a corporation of New Jersey
No Drawing. Filed May 25, 1966, Ser. No. 552,689
Int. Cl. A23b; B65b 33/00
U.S. Cl. 99—166
11 Claims

ABSTRACT OF THE DISCLOSURE

An emulsification composition containing critical amounts of polyoxyethylene ($n$) sorbitan monostearate, polyoxyethylene ($m$) sorbitan mono-oleate, and a mixture of monoglycerides and diglycerides of fat forming fatty acids formed by reacting glycerol mono-oleate with a mixture of oleic acid, palmitic acid, and stearic acid. A stable, aqueous emulsion containing a solute, a dispersed phase, and the above emulsification composition. The solute is either a salt or sugar. The dispersed phase is either an antioxidant or oil.

A method of producing a uniformly coated foodstuff comprising contacting the foodstuff with the above-described emulsion.

---

This invention relates to an emulsification system which provides stable antioxidant or oil emulsions wherein salt or sugar solutions and the antioxidant or oil are in direct contact with one another.

Concentrated aqueous salt or sugar solutions are frequently used as enrobing or coating solutions for foodstuffs. A problem sometimes encountered by addition of the salt solutions is that an undesired pro-oxidant effect is sometimes created by the salt in the presence of another constituent, especially a fat or oil. When this oxidation problem occurs, it is desirable to use an antioxidant in conjunction with the salt solution. Often the antioxidant that is used is insoluble in water, making it difficult to prepare a solution containing it. Problems are also often encountered when attempting to add a sugar solution and oil to a foodstuff as a coating since the two do not often mix readily.

Heretofore, a satisfactory method of uniformly suspending a water insoluble antioxidant or oil in aqueous salt or sugar solutions for application to foodstuffs was unknown. Most antioxidants or oils will not readily mix with a concentrated aqueous salt or sugar solution to give a uniform mixture; and, application of non-uniform mixtures to a foodstuff results in a non-uniform product. Concentrated salt or sugar solutions may be taken to include all salt and sugar solutions of greater than 5% by weight of the solute to total solution. Product uniformity is a necessity because a localized area of high concentration of one of the constituents either presents undesirable flavor effects or unwanted rates of oxidation. Product uniformity cannot, therefore, be achieved unless the enrobing or coating solutions are also uniform mixtures. Prior art has not overcome these problems.

It is an object of this invention to provide a stable emulsion containing a concentrated salt or sugar solution and an antioxidant or oil in direct contact with one another.

It is also an object of this invention to provide a uniform emulsion containing a salt or sugar solution and an antioxidant or oil which can be applied to a foodstuff.

It is a further object of this invention to provide an emulsifier system containing emulsifying agents in such proportions as to be effective in emulsifying water insolubles such as antioxidants or oils in solutions of salt or sugar.

These and other objects of this invention which will be apparent hereinafter are achieved by admixing a salt or sugar solution with an antioxidant or oil and a special mixture of emulsifying agents described hereinafter with the result that the emulsion that is thereby formed will remain stable to separation for a desired time period.

More specifically, the object of this invention is accomplished by admixing a salt or sugar solution with an antioxidant or oil and with a suitable quantity of a special multi-component emulsifier mixture of (1) polyoxyethylene ($n$) sorbitan monostearate, (2) polyoxyethylene ($m$) sorbitan mono-oleate and (3) a mixture of monoglycerides and diglycerides of fat forming fatty acids, as further described hereinafter.

A commercially available mixture of monoglycerides and diglycerides of fat forming fatty acids suitable for use in accordance with this invention is provided by Atlas Chemical Industries, Inc. under the trademark Atmos 300. This product is said to result from the reaction of glycerol mono-oleate with oleic acid, palmitic acid and stearic acid. Hereinafter, this emulsifying agent will be referred to as Atmos 300.

Polyoxyethylene ($n$) sorbitan monostearate is a complex mixture of polyoxyethylene ethers of mixed partial stearic esters of sorbitol and sorbitol anhydride. The ($n$) refers to the average number of polyoxyethylene groups present per mole of the composition and may range between about 10 and 30. Particularly suitable for use is polyoxyethylene (20) sorbitan monostearate, which contains about 20 polyoxyethylene groups per mole of composition and is commercially available being known as "Polysorbate 60."

Polyoxyethylene ($m$) sorbitan mono-oleate is a complex mixture of polyoxyethylene ethers of mixed partial oleate estres of sorbitol and sorbitol anhydride. The ($m$) refers to the average number of polyoxyethylene groups present per mole of the composition and may range between about 10 and 30. Particularly suitable for use is polyoxyethylene (20) sorbitan mono-oleate which contains about 20 polyoxyethylene groups per mole of composition and is commercially available being known as "Polysorbate 80."

The special multi-component emulsifier mixture of this invention is an emulsification composition comprising from 30% to 90% polyoxyethylene ($n$) sorbitan monostearate where $n$ is the number from about 10 to 30, from 0% to 60% by weight of the emulsifier polyoxyethylene ($m$) sorbitan mono-oleate where $m$ is the number from about 10 to 30, and from 8% to 70% by weight of the emulsifier, monoglycerides and diglycerides of fat forming fatty acids formed by reacting glycerol mono-oleate with a mixture of oleic acid, palmitic acid, and stearic acid, wherein the make-up of said emulsification composition is expressed as percent by weight based on the weight of the composition.

This invention provides a stable, aqueous emulsion comprising a solute selected from the group consisting of a salt and sugar, including potassium chloride and dextrose as well as others that are herein described, and a dispersed phase selected from a group of an antioxidant and oil, and a special emulsifier defined above, said emulsifier being present in an amount of from 0.40% to 10% by weight of the total emulsion.

In each of the examples described hereinafter where sodium chloride was used as the salt, a salt solution was prepared by adding a commercially available food grade sodium chloride product to water to make a saturated or nearly saturated solution. The solution was then filtered to remove any insolubles.

In each of the following numbered examples wherein butylated hydroxyanisole was used, the butylated hydroxyanisole was ground with a mortar and pestle and pre-mixed in the desired amount with the surfactants. While butylated hydroxyanisole is used in some of the numbered examples, the practice of this invention is not limited to use of butylated hydroxyanisole. Other substantially water insoluble antioxidants such as butylated hydroxytoluene can also be used.

The stability of the emulsion to separation was arbitrarily numbered according to Table 1, in which the time referred to is the time from start of suspension until the time at which the emulsion separated into two layers. Any suspension stable for more than eight hours is considered satisfactory. As used herein, the term "satisfactory" indicates the emulsion was stable more than eight hours.

Table 1

U=Unsatisfactory (stable less than 8 hours)
1=Stable 8–16 hours
2=Stable 16–24 hours
3=Stable 24–32 hours
4=Stable greater than 32 hours This invention will be further illustrated, but is not limited by the following examples.

Example 1

Various mixtures of two of the three emulsifying agents used in this invention were added to water to determine a level of surfactants which would be nearly optimum for purpose of emulsifying butylated hydroxyanisole in aqueous systems containing no salt or sugar. The hydrophile-lipophile balance was determined at this level. As stated in the Encyclopedia of Chemical Technology, volume 5, pages 702–703, "The approximate required hydrophile-lipophile balance is determined for the given emulsion components in question by observing some test emulsions prepared with various combinations of two emulsifiers, one hydrophilic and the other lipophilic. An estimate of the required balance may be made from the emulsifier combination used in preparing the best of the test emulsions." A hydrophile-lipophile balance may be defined as one-fifth of the weight percent of the hydrophilic content of the molecule.

To determine this hydrophile-lipophile balance Atmos 300, which is lipophilic in character and polyoxyethylene (20) sorbitan mono-oleate, which is hydrophilic in character, were mixed at various levels to determine what hydrophile-lipophile balance resulted in the best emulsion of butylated hydroxyanisole in pure water. While various mixtures of the emulsifiers were found operable though having different hydrophile-lipophile balances, it was found that a hydrophile-lipophile balance (HLB) of 12 gave a good emulsion that could be used as a standard for comparison with other mixtures of differing hydrophile-lipophile balances. However, as will be seen, these mixtures were entirely unsatisfactory as emulsifiers of butylated hydroxyanisole when substantial amounts of salt or sugar were also present.

In accordance with this invention a blend was prepared consisting of polyoxyethylene (20) sorbitan monostearate in an amount of 45% by weight, polyoxyethylene (20) sorbitan mono-oleate in an amount of 45% by weight and Atmos 300 in an amount of 10% by weight. This blend is found entirely satisfactory as an emulsifier of butylated hydroxyanisole in a salt solution. (This blend gave a hydrophile-lipophile balance of 13.8.) Hereinafter, this blend will be referred to as "control," and it illustrates an emulsifier system in accordance with this invention.

Hence, although the Atmos 300 and polyoxyethylene (20) sorbitan mono-oleate blend of emulsifiers providing an HLB of 12 is effective in providing an emulsion of the antioxidant or oil in pure water, it is entirely unsatisfactory as an emulsifier when a salt or sugar is present in a substantial amount. When these latter components are present, as is hereinafter shown, only the blend of emulsifiers in accordance with this invention, an example of which is the control blend, provides a satisfactory stable emulsion.

Example 2

A 23% by weight sodium chloride in water solution was prepared as above described. Varying concentrations of surfactant were added to it. The antioxidant, butylated hydroxyanisole, was held constant at 595 p.p.m. Results are shown in Table 2.

TABLE 2

| Surfactant | Surfactant concentration in percent by weight of total solution | Numerical rating |
|---|---|---|
| A. Polyoxyethylene (20) Sorbitan monostearate. | 0.12 | U |
|  | 0.35 | U |
|  | 0.65 | U |
| B. Polyoxyethylene (20) Sorbitan mono-oleate. | 0.12 | U |
|  | 0.35 | U |
|  | 0.65 | U |
| C. Atmos 300 | 0.12 | U |
|  | 0.35 | U |
|  | 0.65 | U |

From these results it can be seen that the three emulsifying agents used singularly in these amounts do not achieve the desired emulsion. I know of no condition in which these agents, used individually, achieve the desired results. None of the tests of Example 2 are in accordance with this invention.

Example 3

A 23% by weight salt solution was prepared. Varying concentrations of butylated hydroxyanisole and control blend of surfactants were added to it as indicated in Table 3, in order to illustrate operating ranges of surfactant concentration. Results are shown in Table 3.

TABLE 3

| Test Number | Concentration of control blend surfactants in percent by weight of total solution | Butylated hydroxyanisole (p.p.m.) | Numerical rating |
|---|---|---|---|
| 1 | 0.10 | 0 | U |
| 2 | 0.10 | 298 | U |
| 3 | 0.10 | 595 | U |
| 4 | 0.10 | 1,190 | U |
| 5 | 0.40 | 0 | 4 |
| 6 | 0.40 | 298 | 3 |
| 7 | 0.40 | 595 | 2 |
| 8 | 0.40 | 1,190 | 1 |
| 9 | 0.50 | 0 | 4 |
| 10 | 0.50 | 298 | 4 |
| 11 | 0.50 | 595 | 3 |
| 12 | 0.50 | 1,190 | 1 |

Tests Nos. 1 through 4 are not in accordance with this invention. Tests 5 through 12 are in accordance with this invention.

It can thus be seen that an entirely satisfactory emulsion is obtained if the special emulsifier of this invention is present in an amount of at least 0.40% by weight based on the weight of the emulsion. Above that level, the stability of the emulsion continues to improve until emulsifier concentration reaches a point at which the saturation point of the emulsifier in the particular solution is exceeded. At this point a portion of the emulsifier forms a separate phase and the exact concentration at which this occurs depends in part on the particular composition of the emulsified system, and on the concentration of the solute. By observing the level at which emulsifier phase appears one can readily determine the saturation point. This would generally be below about 10% by weight of the total solution. Therefore, a surfactant blend concentration of from 0.40% to the saturation point e.g. below about 10% is found to provide a stable emulsion in a brine solution in accordance with this invention.

Example 4

In this series of tests various concentrations of the control surfactant blend of this invention were used with varying concentrations of sodium chloride as indicated in Table 4, to illustrate the effect of solute concentration on the stability of the emulsion. Butylated hydroxyanisole was held constant at 595 p.p.m. Results are shown in Table 4.

TABLE 4

| Test Number | Concentration of control blend surfactant in percent by weight of total solution | Concentration of NaCl in percent by weight of NaCl solution | Numerical rating |
|---|---|---|---|
| 13 [1] | 0.65 | 20 | 4 |
| 14 [1] | 0.50 | 20 | 2 |
| 15 | 0.35 | 20 | U |
| 16 | 0.21 | 20 | U |
| 17 [1] | 0.65 | 15 | 4 |
| 18 [1] | 0.50 | 15 | 4 |
| 19 | 0.35 | 15 | U |
| 20 | 0.21 | 15 | U |
| 21 [1] | 0.65 | 10 | 4 |
| 22 [1] | 0.50 | 10 | 4 |
| 23 | 0.35 | 10 | U |
| 24 | 0.21 | 10 | U |
| 25 [1] | 0.65 | 5 | 4 |
| 26 [1] | 0.50 | 5 | 4 |
| 27 | 0.35 | 5 | U |
| 28 | 0.21 | 5 | U |

[1] In accordance with this invention.

Tests Nos. 15, 16, 19, 20, 23, 24, 27 and 28 are not in accordance with this invention. Tests Nos. 13, 14, 17, 18, 21, 22, 25 and 26 are in accordance with this invention.

It can thus be seen thta the emulsifying blend concentration can be reduced with a corresponding reduction in solute concentration. It is also shown that as the solute is increased to a point of saturation a corresponding increase in the concentration of my special emulsifier system will provide a preferred stable emulsion.

Example 5

Butylated hydroxyanisole was added to a nearly saturated sodium chloride solution to give a butylated hydroxyanisole concentration of 595 p.p.m. Various surfactant blends were added as indicated in Table 5, to give a total surfactant concentration of 0.5%. Atmos 300 was held constant at 10% by weight of the total surfactant in each of the tests reported in Table 5.

Results are shown in Table 5.

TABLE 5

| Test Number | Concentration of polyoxyethylene (20) sorbitan monostearate in percent by weight of total emulsifiers | Concentration of polyoxyethylene (20) sorbitan monooleate in percent by weight of total emulsifiers | Numerical rating |
|---|---|---|---|
| 29 | 0 | 90 | U |
| 30 | 10 | 80 | U |
| 31 | 20 | 70 | U |
| 32 | 30 | 60 | 2 |
| 33 | 40 | 50 | 2 |
| 34 | 50 | 40 | 2 |
| 35 | 60 | 30 | 3 |
| 36 | 70 | 20 | 2 |
| 37 | 80 | 10 | 3 |
| 38 | 90 | 0 | 3 |
| 39 [1] | 45 | 45 | 4 |

[1] This is the "control" blend.

Tests Nos. 29 through 31 are not in accordance with this invention. Tests 32 through 39 are in accordance with this invention.

With Atmos 300 held constant at 10% by weight based on the weight of the emulsifier, the polyoxyethylene (20) sorbitan monostearate can vary from 30% to 90% and the polyoxyethylene (20) sorbitan mono-oleate can vary from 0% to 60% to achieve an entirely satisfactory stable emulsion. It is also seen that the control blend is about optimum for emulsion purposes.

Example 6

A 23% by weight sugar solution was prepared. To this solution was added coconut oil in an amount of 595 p.p.m. The control blend of emulsifiers was added to this mixture in an amount of 1% by weight of the total solution. The result was found to be a preferred stable sugar and oil emulsion. In a separate test utilizing the conditions of Example 6, except that no emulsifier was employed, the mixture separated immediately. Conventional oils, such as flavor oils, may be used in accordance with this invention in lieu of, or in conjunction with, coconut oil.

Example 7

A syrup was prepared with a saturated sugar solution. Butylated hydroxyanisole was added to this syrup in an amount equal to 595 p.p.m. The control blend of emulsifiers was then added in an amount equal to 1% by weight of the total solution. The result was found to be a preferred stable emulsion. In a separate test utilizing the conditions of Example 7, except that no emulsifier was employed, the mixture separated immediately.

Example 8

A 23% by weight sodium chloride in water solution was prepared. Also, an emulsifier blend was made with polyoxyethylene (20) sorbitan monostearate, polyoxyethylene (20) sorbitan mono-oleate, and Atmos 300 in a ratio of 4.5:4.5:1. An emulsion was prepared by admixing 800 parts of the sodium chloride solution, 2.83 parts of the emulsifier blend, and .265 part of butylated hydroxyanisole. This solution was gradually sprayed on about 5000 parts of steel cut oat groats while the groats were being tumbled. It was found that the antioxidant was sufficiently in contact with the salt as to prevent problems due to oxidation. It was likewise found that the products from each of the examples prepared in accordance with this invention are of acceptable stability as flavoring and coating compositions for foodstuffs.

From the examples it can be seen that this invention significantly advances the art. It provides emulsions containing either concentrated salt or sugar solute and an antioxidant or oil which remain stable to separation. By doing such, this invention has eliminated serious problems commonly encountered when the two classes of constituents must be in direct contact with one another.

I claim:

1. A stable, aqueous emulsion consisting essentially of: a solute selected from the group consisting of a salt and sugar; a dispersed phase selected from the group consisting of an antioxidant and oil; and an emulsifier, said emulsifier being present in an amount of from 0.40% to 10% by weight of the total emulsion, and said emulsifier comprising from 30% to 90% polyoxyethylene ($n$) sorbitan monostearate where $n$ is a number from about 10 to 30, from 0% to 60% polyoxyethylene ($m$) sorbitan mono-oleate where $m$ is a number from about 10 to 30, and from 8% to 70% of a mixture of monoglycerides and diglycerides of fat forming fatty acids formed by reacting glycerol mono-oleate with a mixture of oleic acid, palmitic acid and stearic acid, wherein the composition of said emulsifier is defined in terms of percent by weight based on the weight of the emulsifier.

2. A composition as in claim 1 wherein the antioxidant is butylated hydroxyanisole.

3. A composition as in claim 1 wherein the oil is coconut oil.

4. A composition as in claim 1 wherein the solute is sodium chloride.

5. A composition as in claim 1 wherein the solute is potassium chloride.

6. A composition as in claim 1 wherein the solute is dextrose.

7. A composition as in claim 1 wherein the emulsifier is present in an amount of 0.5%.

8. A composition as in claim 1 wherein $n$ and $m$ are both 20.

9. A composition as in claim 1 wherein $n$ and $m$ are 20 and the polyoxyethylene (20) sorbitan monostearate, the polyoxyethylene (20) sorbitan mono-oleate, and the mixture of monoglycerides and diglycerides of fat forming fatty acids are present in a ratio of 4.5:4.5:1.

10. A composition as in claim 1 wherein the solute is sodium chloride, the antioxidant is butylated hydroxyanisole in an amount of 595 parts per million, $n$ and $m$ are 20, and the polyoxyethylene (20) sorbitan monostearate, the polyoxyethylene (20) sorbitan mono-oleate and the monoglycerides and diglycerides of fat forming fatty acids are in a ratio of 4.5:4.5:1.

11. The method of coating a foodstuff comprising forming an aqueous emulsion comprising a solute selected from the group consisting of salt and sugar, a dispersed phase selected from the group consisting of an antioxidant or oil, and an emulsifier in an amount between 0.4% and 10% by weight based on the weight of the emulsion, said emulsifier comprising from 30% to 90% polyoxyethylene ($n$) sorbitan monostearate wherein $n$ is a number of from about 10 to 30, from 0% to 60% by weight of the emulsifier polyoxyethylene ($m$) sorbitan mono-oleate wherein $m$ is a number from about 10 to 30 and from 8% to 70% monoglycerides and diglycerides of fat forming fatty acids formed by reacting glycerol mono-oleate with a mixture of oleic acid, palmitic acid, and stearic acid, wherein the makeup of the emulsifier is expressed as percent by weight based on the weight of the emulsifier and uniformly contacting the surface of a foodstuff with said emulsion.

References Cited
UNITED STATES PATENTS

| | | | |
|---|---|---|---|
| 2,508,978 | 5/1950 | Tribble | 99—140 |
| 2,819,199 | 1/1958 | Kalish | 99—118 X |
| 3,223,532 | 12/1965 | Pinkalla et al. | 99—166 X |

MAURICE W. GREENSTEIN, Primary Examiner

U.S. Cl. X.R.

99—1, 142, 143, 150, 153; 252—356